United States Patent
Boss et al.

(10) Patent No.: US 10,362,108 B2
(45) Date of Patent: Jul. 23, 2019

(54) APPLICATION TRANSFER USING TIME DELAY AND PROXIMITY DETECTION

(71) Applicant: International Business Machines Corporation, Armonk, NY (US)

(72) Inventors: Gregory J. Boss, Saginaw, MI (US); Andrew R. Jones, Round Rock, TX (US); C. Steven Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 15/198,004

(22) Filed: Jun. 30, 2016

(65) Prior Publication Data

US 2018/0007132 A1     Jan. 4, 2018

(51) Int. Cl.
| | |
|---|---|
| *H04L 29/06* | (2006.01) |
| *H04L 29/08* | (2006.01) |
| *H04W 28/02* | (2009.01) |
| *H04W 28/08* | (2009.01) |
| *H04W 28/22* | (2009.01) |
| *H04W 28/26* | (2009.01) |
| *H04W 48/06* | (2009.01) |

(52) U.S. Cl.
CPC .......... *H04L 67/1095* (2013.01); *H04L 67/04* (2013.01); *H04L 67/10* (2013.01); *H04L 67/42* (2013.01); *H04L 69/03* (2013.01); *H04W 28/0247* (2013.01); *H04W 28/0268* (2013.01); *H04W 28/0289* (2013.01); *H04W 28/08* (2013.01); *H04W 28/22* (2013.01); *H04W 28/26* (2013.01); *H04W 48/06* (2013.01)

(58) Field of Classification Search
CPC ......... H04W 28/0268; H04W 28/0289; H04W 28/08; H04W 28/0247; H04W 28/22; H04W 28/26; H04W 48/06
USPC ....................................... 709/223
See application file for complete search history.

(56) References Cited

U.S. PATENT DOCUMENTS

| | | |
|---|---|---|
| 2004/0203381 A1 | 10/2004 | Cahn et al. |
| 2005/0089067 A1 | 4/2005 | Kinoshita et al. |

(Continued)

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Chris Parry
*Assistant Examiner* — Weiwei Y Stiltner
(74) *Attorney, Agent, or Firm* — Yee & Associates, P.C.; Brian Restauro

(57) ABSTRACT

Transferring a set of elements between devices is provided. A set of rules governing a transfer of the set of elements from a sending client device to a receiving client device is received. The set of elements for the transfer is received from the sending client device. It is determined whether the set of rules governing the transfer of the set of elements from the sending client device to the receiving client device are met. In response to determining that the set of rules governing the transfer of the set of elements from the sending client device to the receiving client device are met, the set of elements is transferred to the receiving client device.

20 Claims, 10 Drawing Sheets

(56) References Cited

U.S. PATENT DOCUMENTS

| | | | | |
|---|---|---|---|---|
| 2008/0281977 A1* | 11/2008 | Branam | ............ | H04N 7/17318 709/231 |
| 2012/0092721 A1* | 4/2012 | Jaudon | ................. | G06F 3/1204 358/1.15 |
| 2013/0132457 A1* | 5/2013 | Diwakar | ............... | G06F 9/5072 709/201 |
| 2014/0004839 A1 | 1/2014 | Block et al. | | |
| 2014/0258357 A1* | 9/2014 | Singh | ..................... | H04L 67/10 709/201 |
| 2014/0269305 A1* | 9/2014 | Nguyen | .................. | H04L 45/28 370/235 |
| 2014/0277843 A1* | 9/2014 | Langlois | ............. | H04M 1/6091 701/2 |
| 2014/0310709 A1* | 10/2014 | Nirantar | ............... | G06F 9/5027 718/1 |
| 2015/0004912 A1 | 1/2015 | Diamond et al. | | |
| 2015/0244775 A1* | 8/2015 | Vibhor | ................... | G06Q 10/06 709/203 |
| 2016/0380914 A1* | 12/2016 | Tuukkanen | ............. | H04L 67/16 709/226 |
| 2017/0257431 A1* | 9/2017 | Zhao | .................. | H04L 67/1014 |

OTHER PUBLICATIONS

"Use Continuity to Connect Your iPhone, iPad, iPod touch, and Mac," Apple Inc., Nov. 10, 2015, 5 pages. https://support.apple.com/en-us/HT204681.

\* cited by examiner

APPLICATION TRANSFER USING TIME DELAY AND PROXIMITY DETECTION

BACKGROUND

1. Field

The disclosure relates generally to application transfer and more specifically to performing a transfer or transposition of an application and corresponding context data from one data processing device to another data processing device using time delay and user proximity detection controls.

2. Description of the Related Art

With the proliferation of connected data processing devices, users often find themselves owning and using multiple devices be it for work or personal purposes. These data processing devices may include a laptop computer, a desktop computer, a smart phone, and a tablet computer. All of these devices may be connected and enabled for business tasks, personal tasks, and a combination of both. When using multiple devices, users often move from one device to another depending on the task that needs to be completed. For example, a user may learn about a task that needs to be completed, such as the user opening an email on the user's smart phone, but the user prefers or the user can only complete that task using a laptop computer. This may be driven by personal preferences of the user or by necessity. For example, the application required to complete the task only runs on the laptop computer. One issue is that this transfer often requires multiple user steps to setup. A second issue is that the second device may not be immediately available for the transfer.

SUMMARY

According to one illustrative embodiment, a computer-implemented method for transferring a set of elements between devices is provided. A computer receives a set of rules governing a transfer of the set of elements from a sending client device to a receiving client device. The computer receives the set of elements for the transfer from the sending client device. The computer determines whether the set of rules governing the transfer of the set of elements from the sending client device to the receiving client device are met. In response to the computer determining that the set of rules governing the transfer of the set of elements from the sending client device to the receiving client device are met, the computer transfers the set of elements to the receiving client device. According to other illustrative embodiments, a computer system and computer program product for transferring a set of elements between devices are provided.

DETAILED DESCRIPTION

Figure 1:
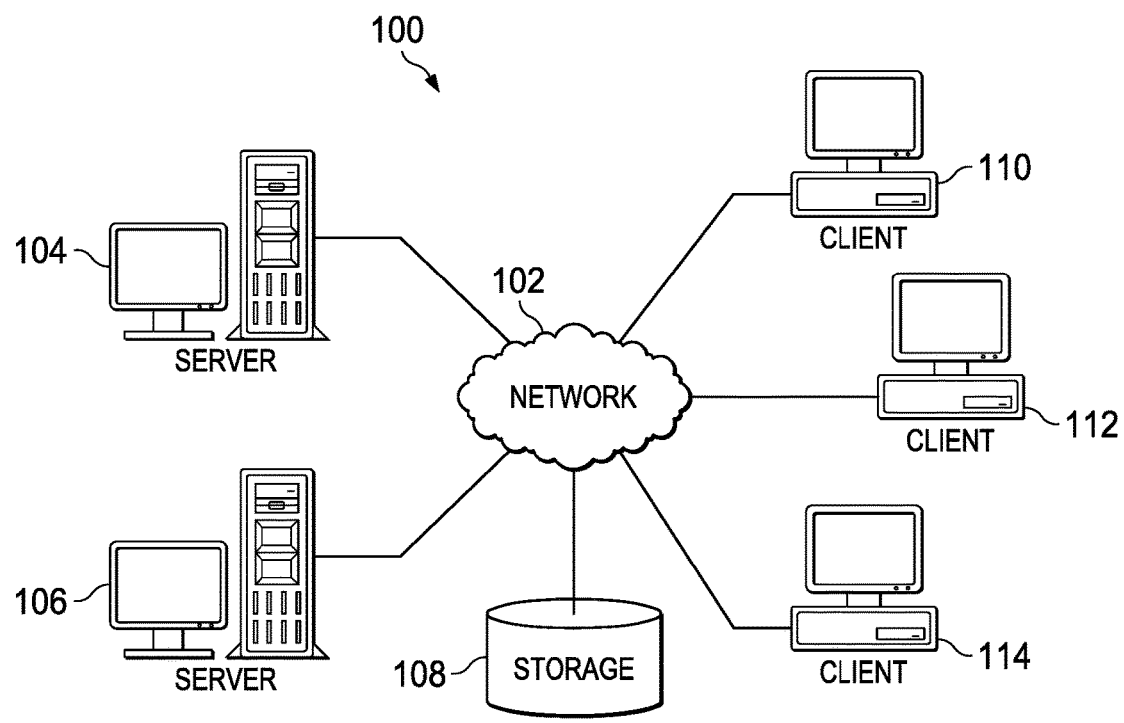
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers. In addition, server 104 and server 106 may be transition entities that provide a set of one or more transposition services to registered client devices. Transposition is the act of transferring a set of one or more elements of an application and corresponding sending client device context data from the sending client device to a receiving client device. Server 104 and server 106 may utilize time delay and user proximity detection controls while providing the set of transposition services.

Client 110, client 112, and client 114 also connect to network 102. Clients 110, 112, and 114 are registered clients of server 104 and server 106. Server 104 and server 106 also may provide information, such as boot files, operating system images, and software applications to clients 110, 112, and 114.

In this example, clients 110, 112, and 114 are shown as desktop computers that may include wire or wireless communication links to network 102. However, it should be noted that clients 110, 112, and 114 are intended as examples only. In other words, clients 110, 112, and 114 also may include other devices, such as, for example, laptop computers, handheld computers, such as tablet computers, smart phones, smart watches, personal digital assistants, gaming devices, set-top boxes, or any combination thereof. Users of clients 110, 112, and 114 may use clients 110, 112, and 114 to access the set of transposition services provided by server 104 or server 106 to transfer, for example, an application and corresponding context state from a source or sending client device to a target or receiving client device without losing state.

Storage 108 is a network storage device capable of storing any type of data in a structured format or an unstructured format. In addition, storage 108 may represent a set of one or more network storage devices. Storage 108 may store, for example, names and identification data corresponding to a plurality of different client device users, user account information, user profiles, user authentication credential data corresponding to each of the different client device users, transposition governance rules, transposition maximum wait time thresholds when receiving client devices are not available at initiation of a transposition process, identification data corresponding to sending and receiving client devices, and the like. The user authentication credential data may include, for example, usernames, passwords, biometric data, or any combination thereof. The biometric data may be, for example, a biometric template. A biometric template is a digital representation of a client device user's distinct characteristics that have been extracted from a biometric sample. A biometric sample of a client device user may be obtained by, for example, a fingerprint scanner, a palm scanner, a retinal scanner, a facial scanner, or a voice scanner of the client device. The biometric template is used during a process to authenticate the user of the client device.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example and not as an architectural limitation for the different illustrative embodiments.

Figure 2:
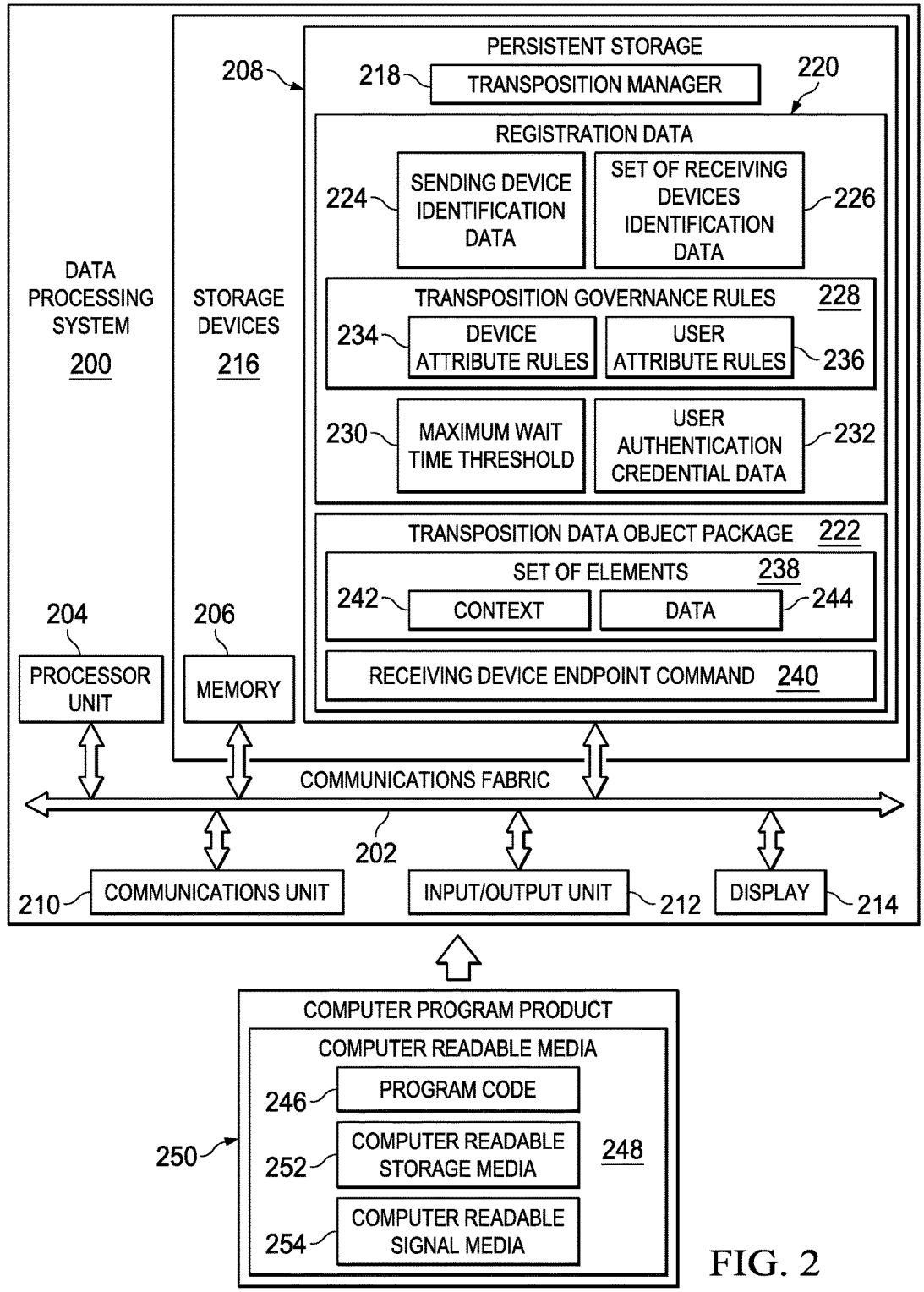
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a transition entity computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores transposition manager 218. Transposition manager 218 monitors and controls the transfer of a set of one or more elements, such as an application, data within an application, and/or data, and corresponding sending device context data from a sending device to a receiving device. It should be noted that even though transposition manager 218 is illustrated as residing in persistent storage 208, in an alternative illustrative embodiment transposition manager 218 may be a separate component of data processing system 200. For example, transposition manager 218 may be a hardware component coupled to communication fabric 202 or a combination of hardware and software components.

Also in this example, persistent storage 208 stores registration data 220 and transposition data object package 222. However, it should be noted that alternative illustrative embodiments may include more or less data than illustrated. Registration data 220 represents information utilized by transposition manager 218 to perform the transposition or transfer of the set of elements from the sending device to the receiving device. In this example, registration data 220 includes sending device identification data 224, set of receiving devices identification data 226, transposition governance rules 228, maximum wait time threshold 230, and user authentication credential data 232.

Sending device identification data 224 uniquely identifies a particular sending device corresponding to a particular transposition of a set of elements by a user of the particular sending device. However, it should be noted that sending device identification data 224 may represent information that identifies a plurality of different sending devices corresponding to a plurality of different users. Set of receiving devices identification data 226 uniquely identifies a set of one or more devices that correspond to the user of the particular sending device involved with the particular transposition of the set of elements. However, it should be noted that set of receiving devices identification data 226 may represent information that identifies a plurality of different sets of receiving devices corresponding to respective different sending devices used by different users.

Transposition manager 218 utilizes transposition governance rules 228 to control transfer of the set of elements from the sending device to the receiving device during the transposition process. However, it should be noted that transposition governance rules 228 also may be stored and applied in the sending device and/or the receiving device in addition to the transition entity (i.e., data processing system 200). Also, it should be noted that transposition governance rules 228 may be defined by a user of the sending device and/or defined by a system administrator of the transposition service.

In this example, transposition governance rules 228 include device attribute rules 234 and user attribute rules 236. Device attribute rules 234 for an allowable transposition may include, for example, specified time of day and day of week when a transposition may occur, physical geographic locations of the devices during the transposition, owner of the devices involved in the transposition, configuration/security posture of the devices involved in the transposition, required or minimum receiver device application version level, and the like. User attribute rules 236 for allowable transposition may include, for example, an identification of a set of users that can receive the transposition, an identification of a type of user authentication credential data required prior to viewing the transposition information, and the like.

Maximum wait time threshold 230 represents a threshold value above which stored transposition information, such as transposition data object package 222, is deleted. In other words, transposition manager 218 waits until maximum wait time threshold 230 is exceeded to delete transposition data object package 222 from persistent storage 208 when a receiving device is not available at initiation of the transposition process. Maximum wait time threshold 230 may be, for example, one minute, one hour, one day, one week, one month, or any other increment of time defined by a user or administrator.

User authentication credential data 232 may include, for example, a username, a password, a set of biometric data, or any combination thereof. Transposition manager 218 utilizes user authentication credential data 232 to verify an identity of a particular user requesting receipt of transposition data object package 222 on a receiving device involved in the transposition process. However, it should be noted that the receiving device, itself, may perform the user authentication process without utilizing data processing system 200.

Transposition data object package 222 represents the information that the user of the sending device wants to transfer to the receiving device. In this example, transposition data object package 222 includes set of elements 238 and receiving device endpoint command 240. However, it should be noted that receiving device endpoint command 240 is optionally included in transposition data object package 222. Set of elements 238 represents the information the user wants to send. An element in set of elements 238 may be, for example, an application, data within an application, or data. For example, an element may be a PDF viewer application showing a PDF document on the sending device, an email displayed on the sending device (i.e., data within an email application), data corresponding to an image displayed on the sending device, such as data in a photo viewer application, and the like.

In this example, set of elements 238 includes context 242 and data 244. Context 242 represents the system wide context of data processing system 200, which corresponds to set of elements 238 at initiation of the transposition process. Data 244 represents any other information necessary for the receiving device to properly bring into focus set of elements 238 on the receiving device.

Receiving device endpoint command 240 represents a command line, which may change settings or initiate actions on the receiving device, input by the user on the sending device. A endpoint command may be, for example, to automatically start a specific application on the receiving device corresponding to set of elements 238 in transposition data object package 222, to open set of elements 238 in transposition data object package 222 in a protected mode, to place an object into a specific location on the receiving device, to dim a display of the receiving device so that only the user of the receiving device may read what is displayed on the receiving device, or to automatically start an application to display information on the receiving device and then minimize to desktop.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
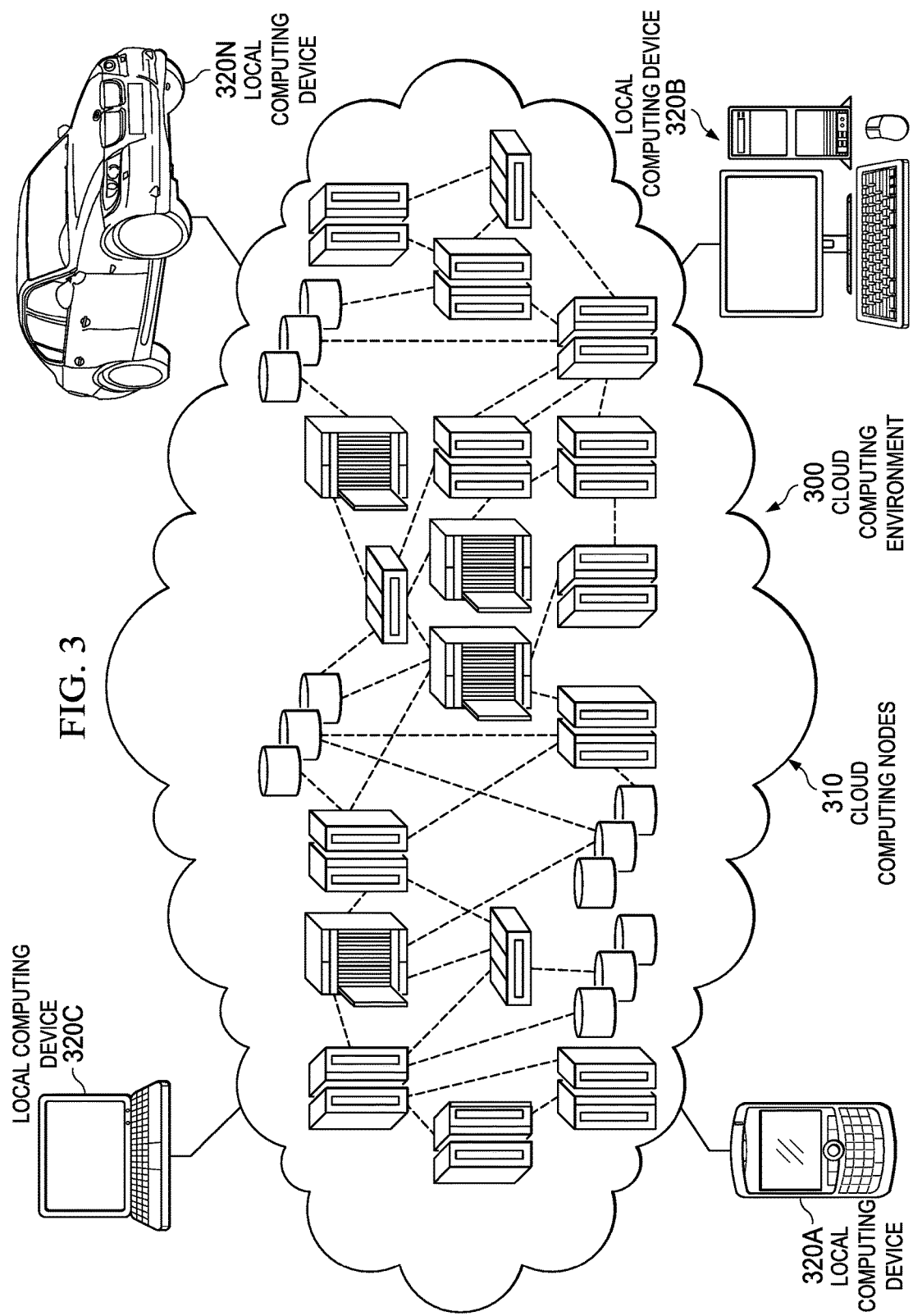
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of computing devices 320A-320N are intended to be illustrative only and that cloud computing nodes 310 and cloud computing environment 300 can communicate with any type of computerized device over any type of network and/or network addressable connection using a web browser, for example.

Figure 4:
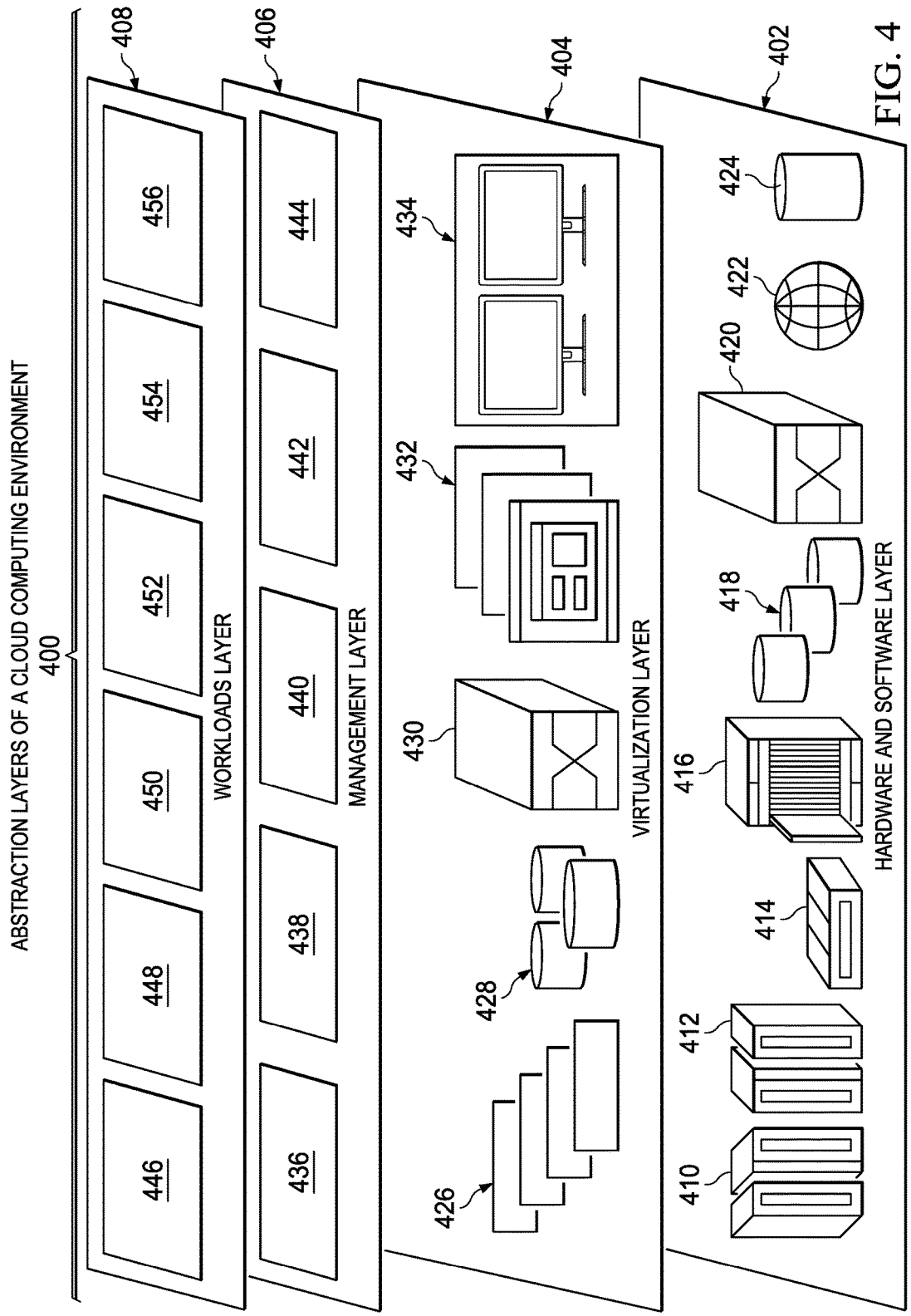
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided:

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and transposition processing 456.

In the course of developing illustrative embodiments, it was discovered that a user may want to start using an application on one data processing device and then want to pick up where the user left off on a different data processing device. Currently, the user signs into an account or service corresponding to the data processing devices to transfer the application between devices. Then, the user places both data processing devices near one another and turns on some type of bluetooth technology or connects both devices to the same wireless fidelity (Wi-Fi) network enabling communication between devices for the transfer.

However, this prior art technology only hands off a single application rather than a data processing system wide "context" corresponding to the application. Illustrative embodiments instead transfer more than the single application by also transferring a set of one or more applications related to the work the user is currently engaged in. For example, if the user is currently working in a corporate email application, then illustrative embodiments determine the data processing system wide context and include, for example, an email client application, a virtual private network (VPN) application, a web page to the corporate directory, and the corporation's homepage in the transfer or transposition. As another example, if the user is working on a personal email regarding the Boys Scouts of America (BSA), then illustrative embodiments determine the data processing system wide context and include, for example, an email client application, two of ten open web pages on the data processing system that relate to the BSA, as well as, a PDF document showing Eagle Scout requirements displayed on the data processing system. The prior art technology also requires that the user "pull" the application transfer after logging into the second data processing device. In contrast, illustrative embodiments "push" the application and corresponding system wide context information to the second data processing device without requiring the user to first login and go through the additional steps. Furthermore, the prior art technology requires that the two data processing devices be in close physical proximity (e.g., Bluetooth®/Wi-Fi range) at the time of the transfer. In contrast, illustrative embodiments do not require close proximity of both devices, but may require close proximity of the user to the second data processing device before completing the transposition process.

Illustrative embodiments perform a transposition or transfer of an application from a sending device to a receiving device using time delay and user proximity detection controls. Illustrative embodiments allow the user to transfer the application and corresponding context state from the sending or source device to the receiving or target device without losing state. Illustrative embodiments may delay the actual transfer of the application until the user comes in close proximity to the receiving device. In addition, illustrative embodiments also may delay the transfer based on a set of time-based transfer thresholds.

Multiple data processing devices are connected to a transition entity. For example, a sending device may be a smart phone and a receiving device may be a laptop computer. An event occurs, such as, for example, an application notification, a monitored event, receipt of an email, or specified user action, on the data processing device the user is currently using. The user marks the event and associated workload to be "pushed" to a different data processing device, along with a set of defined transposition governance rules or conditions to control this transfer. When the transposition governance rules/conditions are met, then the event is brought in focus on the receiving data processing device. To bring the event into focus on the receiving device means that the event is now able to be viewed and used by the user on the receiving device.

Illustrative embodiments describe the movement of application content from the same type of application, such as, for example, a same type of word processing application, installed on both devices involved in the transposition; and more specifically describe how to control and govern the transposition process. As an example, a user is traveling from work to home. The user receives an email, which requires a response, on the user's smart phone while traveling. However, because some data required to respond is only on the user's laptop computer an immediate response from the smart phone is not possible. The user utilizes an illustrative embodiment to push the task to the user's laptop computer with a defined transposition governance rule of make active only when smart phone is co-located with the laptop computer (e.g. on a same personal area network within Bluetooth range, GPS proximity, etc.). In another example, the user is working on a word document on the user's laptop and desires to transfer the word document to the user's desktop computer to work on when the user returns from a business trip.

Thus, illustrative embodiments provide advantages over existing technology systems by providing a rules-based system that controls how tasks can be transferred between a plurality of data processing devices gaining additional control and security in doing so. For example, illustrative embodiments provide the transposition of data processing tasks from one associated device to another associated device in an asynchronous manner by: 1) allowing for complete application context to be provided; 2) specifying the time in which the application should transfer the workload; and 3) providing application focus on the receiving device.

Illustrative embodiments provide an initial registration of client devices. Illustrative embodiments may be controlled by an individual or other party, such as, for example, a corporation or division within a corporation. The controller may define what rules or rule limitations apply and what devices can be registered.

As an application event occurs, the user of the sending device makes a decision to initiate a push. This request goes from the sending device to the transition entity. This push initiation could be a simple button push on the application, such as a plug-in on a presentation program or a browser, or a separate application that allows a user to select from existing applications.

In one illustrative embodiment, the transition entity runs on a separate device (e.g. a cloud-based Software as a Service (SaaS) offering). The transition entity applies any transposition governance rules associated with the transfer and stores the content related to the transposition request (e.g., a store and forward architecture). Again, these could be rules defined by the user during the push (e.g., transfer at 5:00 p.m. or when my smart phone is next to my laptop) and/or rules applied by the transition entity's controlling party (e.g., corporate rules). It should be noted that transposition governance rules may not be able to be validated immediately. For example, if a receiving device is not on-line or not started, illustrative embodiments will defer rule validation until that receiving device is available.

Once the rules are applied, the transition entity will validate the rules. This validation process, while rule dependent, may require the transition entity to communicate with the receiving device and possibly the sending device. Once all rules are validated, the transition entity will pass the transposition request to the receiving device, which will then process that request and complete the transposition so the user can use that device to handle the event of interest.

Figure 5:
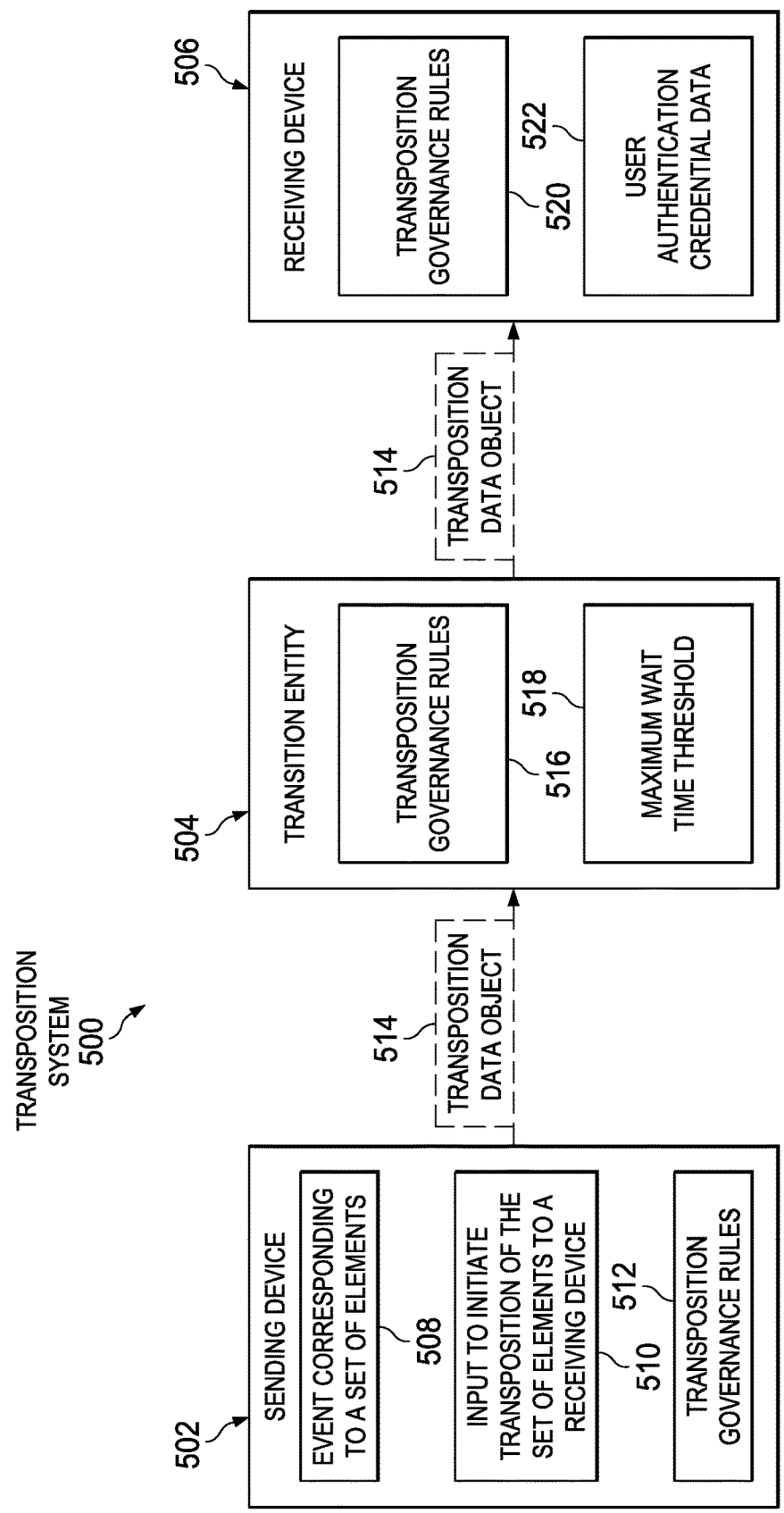
FIG. 5 is a diagram of an example transposition system in accordance with an illustrative embodiment.

With reference now to FIG. 5, a diagram of an example transposition system is depicted in accordance with an illustrative embodiment. Transposition system 500 may be implemented in, for example, a network of data processing systems, such as network data processing system 100 in FIG. 1 or in a cloud computing environment, such as cloud computing environment 300 in FIG. 3.

In this example, transposition system 500 includes sending device 502, transition entity 504, and receiving device 506. Sending device 502 and receiving device 506 may be, for example, client 110 and client 112 in FIG. 1, respectively, or a local computing device 320N and local computing device 320B in FIG. 3, respectively. Transition entity 504 may be, for example, server 104 in FIG. 1, data processing system 200 in FIG. 2, or a cloud computing node in cloud computing nodes 310 in FIG. 3. It should be noted that even though transition entity 504 is illustrated as a separate or independent device, alternative illustrative embodiments may include transition entity 504 in either sending device 502 or receiving device 506 or may include components of transition entity 504 in both sending device 502 and receiving device 506. If transition entity 504 is co-located, then communication would be a peer-to-peer communication pattern, for example. Also, it should be noted that transposition system 500 may include any number of sending devices, transition entities, and receiving devices.

In this example, an indication of event corresponding to a set of elements 508 is displayed on sending device 502. The set of elements may be, for example, set of elements 238 in FIG. 2. In response to receiving the indication, a user of sending device 502 inputs input to initiate transposition of the set of elements to a receiving device 510. Sending device 502 determines whether the set of elements for transposition comply with transposition governance rules 512 prior to initiating the transposition process. Transposition governance rules 512 may be, for example, transposition governance rules 228 in FIG. 2. In response to determining that the set of elements corresponding to the transposition comply with transposition governance rules 512, sending device 502 transmits transposition data object 514 to transition entity 504. Transposition data object 514 may be, for example, transposition data object package 222, which includes set of elements 238, context 242, and data 244, in FIG. 2.

Upon receiving transposition data object 514, transition entity 504 determines whether transposition data object 514 complies with transposition governance rules 516. In response to determining that transposition data object 514 complies with transposition governance rules 516, transition entity 504 determines whether receiving device 506 is currently available to receive transition data object 514. In response to determining that receiving device 506 is not currently available to receive transition data object 514, transition entity 504 stores transition data object 514.

While storing transition data object 514, transition entity 504 determines whether maximum wait time threshold 518 has been exceeded. Maximum wait time threshold 518 may be, for example, maximum wait time threshold 230 in FIG. 2. In response to determining that maximum wait time threshold 518 has not been exceeded, transition entity 504 continues to store transition data object 514. In response to determining that maximum wait time threshold 518 has been exceeded, transition entity 504 deletes transition data object 514 from storage. In response to determining that receiving device 506 is currently available to receive transition data object 514, transition entity 504 transmits transition data object 514 to receiving device 506.

Upon receiving transposition data object 514, receiving device 506 determines whether transposition data object 514 complies with transposition governance rules 520. In response to determining that transposition data object 514 complies with transposition governance rules 520, receiving device 506 determines whether user authentication credential data 522 is required to verify an identity of the user of receiving device 506 prior to displaying the information associated with transposition data object 514. In response to determining that user authentication credential data 522 is required, receiving device 506 collects that appropriate user authentication credential data from the user. If collected user authentication credential data 522 matches stored user authentication data, then receiving device 506 brings the information corresponding to transposition data object 514 into focus within a display on receiving device 506 for the user to view. If collected user authentication credential data 522 does not match stored user authentication data, then receiving device 506 may delete transposition data object 514. Alternatively, receiving device 506 may send user authentication credential data 522 to transition entity 504 to perform the user authentication process.

Figure 6:
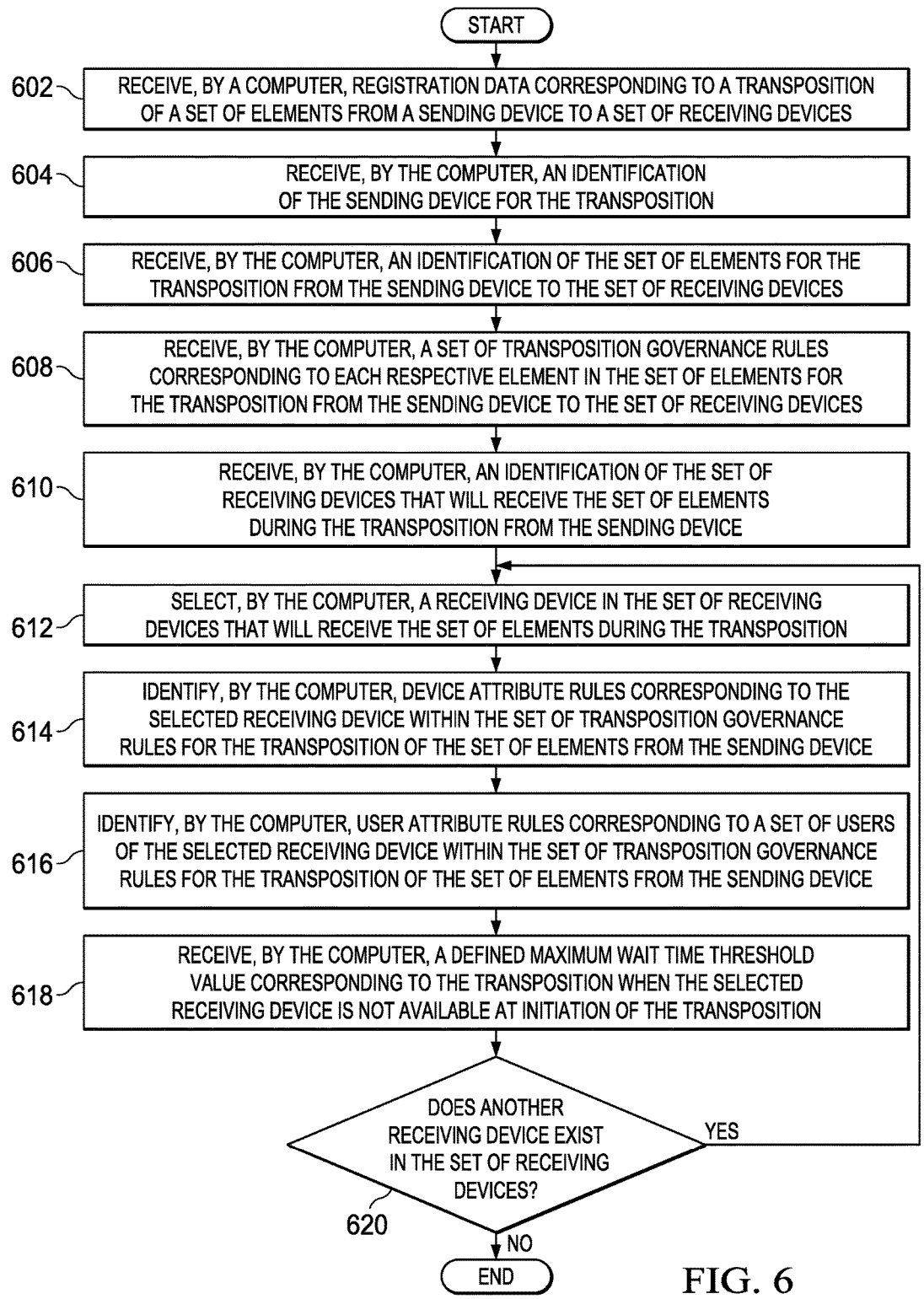
FIG. 6 is a flowchart illustrating a process for registering devices in accordance with an illustrative embodiment.

With reference now to FIG. 6, a flowchart illustrating a process for registering devices is shown in accordance with an illustrative embodiment. The process shown in FIG. 6 may be implemented in a computer, such as, for example, server 104 in FIG. 1, data processing system 200 in FIG. 2, a cloud computing node in cloud computing nodes 310 in FIG. 3, and transition entity 504 in FIG. 5.

The process begins when the computer receives a registration corresponding to transposition of a set of elements from a sending device to a set of receiving devices (step 602). The set of elements may be, for example, set of elements 238 in FIG. 2. The sending device may be, for example, client 110 in FIG. 1, local computing device 320A in FIG. 3, or sending device 502 in FIG. 5. The set of receiving devices may be a set of one or more receiving devices, such as, for example, client 112 and client 114 in FIG. 1, local computing device 320B and local computing device 320C in FIG. 3, or receiving device 506 in FIG. 5.

In addition, the computer receives an identification of the sending device for the transposition (step 604). Further, the computer receives an identification of the set of elements for the transposition from the sending device to the set of receiving devices (step 606). Moreover, the computer receives a set of transposition governance rules corresponding to each respective element in the set of elements for the transposition from the sending device to the set of receiving devices (step 608). The set of transposition governance rules may be, for example, transposition governance rules 228 in FIG. 2. The computer also receives an identification of the set of receiving devices that will receive the set of elements during the transposition from the sending device (step 610).

Afterward, the computer selects a receiving device in the set of receiving devices that will receive the set of elements during the transposition (step 612). Furthermore, the computer identifies device attribute rules corresponding to the selected receiving device within the set of transposition governance rules for the transposition of the set of elements from the sending device (step 614). The device attribute rules may be, for example, device attribute rules 234 in FIG. 2. The device attribute rules for an allowable transposition may include, for example, time of day corresponding to the transposition, physical geographic location of the receiving device, ownership of the receiving device, receiving device configuration/security posture, required or minimum receiving device application version level, and the like. In addition, the computer identifies user attribute rules corresponding to a set of users of the selected receiving device within the set of transposition governance rules for the transposition of the set of elements from the sending device (step 616). The user attribute rules may be, for example, user attribute rules 236 in FIG. 2. The user attribute rules for allowable transposition may be, for example, identification of a set of receiving device users that can view the transposition, user authentication credential data required prior to viewing the transposition, and the like. The computer also receives a defined maximum wait time threshold value corresponding to the transposition when the selected receiving device is not available at initiation of the transposition (step 618). The defined maximum wait time threshold value may be, for example, maximum wait time threshold 230 in FIG. 2.

Then, the computer makes a determination as to whether another receiving device exists in the set of receiving devices (step 620). If the computer determines that another receiving device does exist in the set of receiving devices, yes output of step 620, then the process returns to step 612 where the computer selects another receiving device in the set of receiving devices. If the computer determines that another receiving device does not exist in the set of receiving devices, no output of step 620, then the process terminates thereafter.

Figure 7:
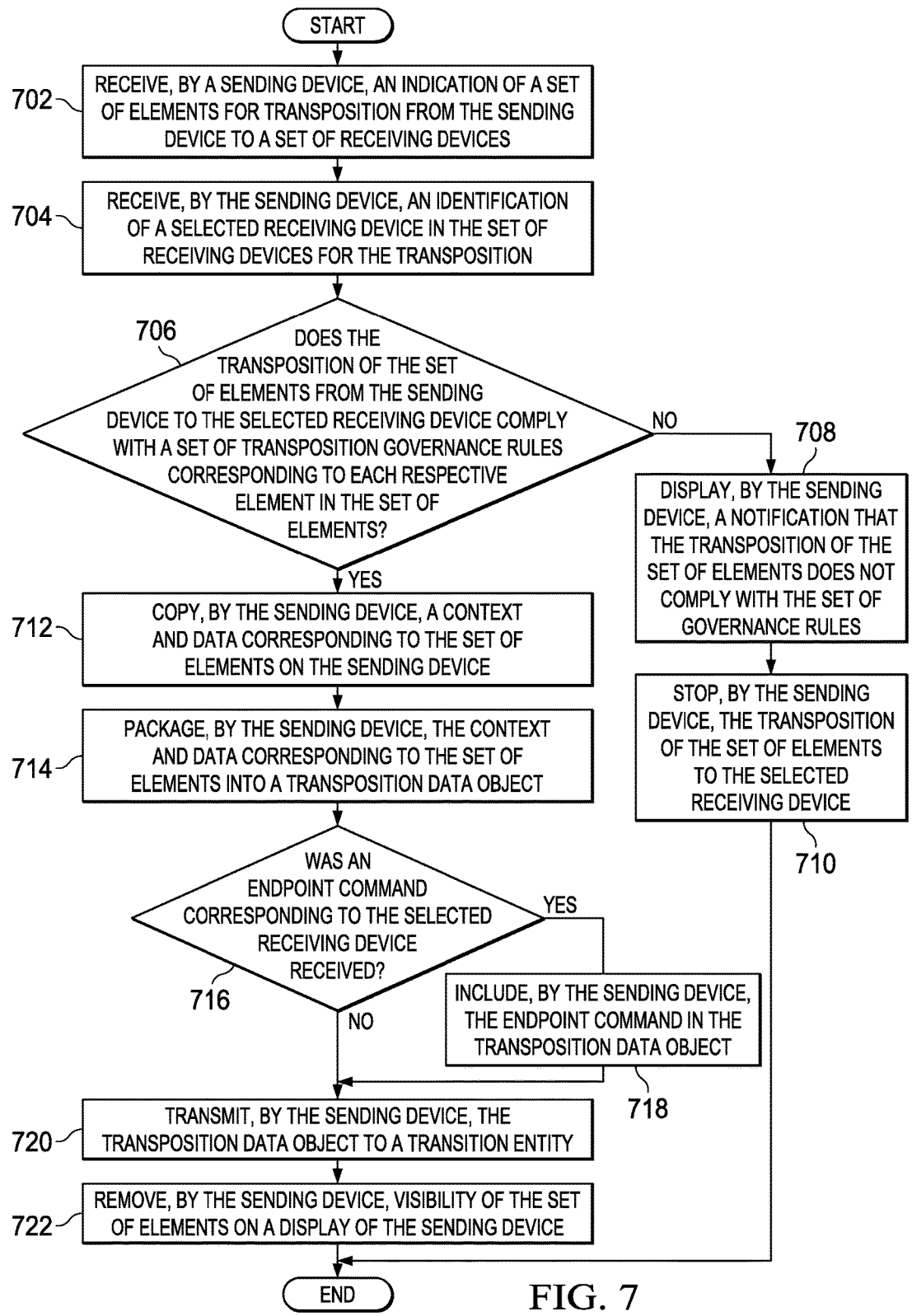
FIG. 7 is a flowchart illustrating a process for a sending device in accordance with an illustrative embodiment.

With reference now to FIG. 7, a flowchart illustrating a process for a sending device is shown in accordance with an illustrative embodiment. The process shown in FIG. 7 may be implemented in a sending data processing system device, such as, for example, client 110 in FIG. 1, local computing device 320A in FIG. 3, and sending device 502 in FIG. 5.

The process begins when the sending device receives an indication of a set of elements for transposition from the sending device to a set of receiving devices (step 702). An element in the set of elements may be an application, data within an application, or data. For example, an element may be a PDF viewer application showing a PDF document, a single email (i.e., data within an email application), data corresponding to an image, such as data in a photo viewer application, and the like. The set of receiving devices may be one or more receiving devices, such as clients 112 and 114 in FIG. 1, local computing devices 320B, 320C, and 320N in FIG. 3, or receiving device 506 in FIG. 5.

In addition, the sending device receives an identification of a selected receiving device in the set of receiving devices for the transposition (step 704). Further, the sending device makes a determination as to whether the transposition of the set of elements from the sending device to the selected receiving device complies with a set of transposition governance rules corresponding to each respective element in the set of elements (step 706). The set of transposition governance rules may be, for example, transposition governance rules 512 in FIG. 5.

If the sending device determines that the transposition of the set of elements from the sending device to the selected receiving device does not comply with the set of transposition governance rules corresponding to each respective element in the set of elements, no output of step 706, then the sending device displays a notification that the transposition of the set of elements does not comply with the set of governance rules (step 708). Furthermore, the sending device stops the transposition of the set of elements to the selected receiving device (step 710). Thereafter, the process terminates.

If the sending device determines that the transposition of the set of elements from the sending device to the selected receiving device does comply with the set of transposition governance rules corresponding to each respective element in the set of elements, yes output of step 706, then the sending device copies a context and data corresponding to the set of elements on the sending device (step 712). The context and data may be, for example, context 242 and data 244 in FIG. 2. Afterward, the sending device packages the context and data corresponding to the set of elements into a transposition data object (step 714). The packaged transposition data object may be, for example, transposition data object package 222 in FIG. 2 or transposition data object 514 in FIG. 5.

Moreover, the sending device makes a determination as to whether an endpoint command corresponding to the selected receiving device was received (step 716). The endpoint command may be, for example, automatically start a specific application on the receiving device corresponding to the set of elements in the transposition data object, open the set of elements in the transposition data object in a protected mode, place an object into a specific location on the receiving device, dim display of the receiving device so that only the intended user of the receiving device may read what is displayed on the receiving device, or automatically start an application to display information on the receiving device and then minimize to desktop. If the sending device determines that an endpoint command corresponding to the selected receiving device was not received, no output of step 716, then the process proceeds to step 720. If the sending device determines that an endpoint command corresponding to the selected receiving device was received, yes output of step 716, then the sending device includes the endpoint command in the transposition data object (step 718).

Subsequently, the sending device transmits the transposition data object to a transition entity (step 720). The transition entity may be, for example, server 104 in FIG. 1, data processing system 200 in FIG. 2, a cloud computing node in cloud computing nodes 310 in FIG. 3, or transition entity 504 in FIG. 5. The sending device may transmit the transposition data object to the transition entity via a network, such as network 102 in FIG. 1. Optionally, the sending device may remove visibility of the set of elements on a display of the sending device (step 722). Thereafter, the process terminates.

Figure 8:
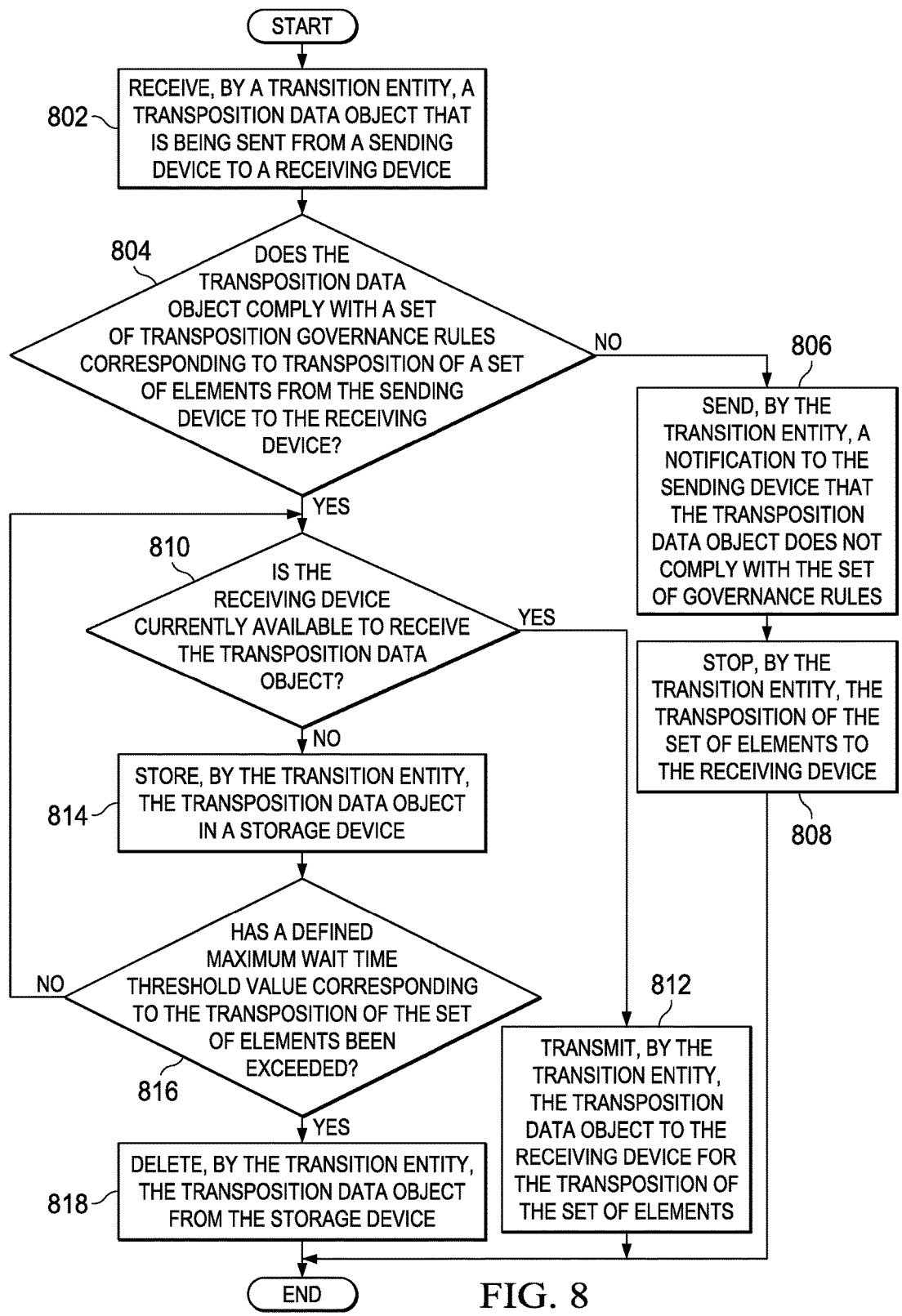
FIG. 8 is a flowchart illustrating a process for a transition entity in accordance with an illustrative embodiment.

With reference now to FIG. 8, a flowchart illustrating a process for a transition entity is shown in accordance with an illustrative embodiment. The process shown in FIG. 8 may be implemented in a transition entity computer, such as, for example, server 104 in FIG. 1, data processing system 200 in FIG. 2, a cloud computing node in cloud computing nodes 310 in FIG. 3, or transition entity 504 in FIG. 5.

The process begins when the transition entity receives a transposition data object that is being sent from a sending device to a receiving device (step 802). The transposition data object may be, for example, transposition data object package 222 in FIG. 2 or transposition data object 514 in FIG. 5. The sending device may be, for example, client 110 in FIG. 1, local computing device 320A in FIG. 3, or sending device 502 in FIG. 5. The receiving device may be, for example, client 112 in FIG. 1, local computing device 320B in FIG. 3, or receiving device 506 in FIG. 5.

Afterward, the transition entity makes a determination as to whether the transposition data object complies with a set of transposition governance rules corresponding to transposition of a set of elements from the sending device to the receiving device (step 804). The set of transposition governance rules may be, for example, transposition governance rules 228 in FIG. 2 or transposition governance rules 516 in FIG. 5. If the transition entity determines that the transposition data object does not comply with the set of transposition governance rules corresponding to transposition of the set of elements from the sending device to the receiving device, no output of step 804, then the transition entity sends a notification to the sending device that the transposition data object does not comply with the set of governance rules (step 806). Further, the transition entity stops the transposition of the set of elements to the receiving device (step 808). Thereafter, the process terminates.

If the transition entity determines that the transposition data object does comply with the set of transposition governance rules corresponding to transposition of the set of elements from the sending device to the receiving device, yes output of step 804, then the transition entity makes a determination as to whether the receiving device is currently available to receive the transposition data object (step 810). If the transition entity determines that the receiving device is currently available to receive the transposition data object, yes output of step 810, then the transition entity transmits the transposition data object to the receiving device for the transposition of the set of elements (step 812). The transition entity may transmit the transposition data object to the receiving device via a network, such as network 102 in FIG. 1.

If the transition entity determines that the receiving device is not currently available to receive the transposition data object, no output of step 810, then the transition entity stores the transposition data object in a storage device (step 814). The storage device may be, for example, persistent storage 208 in FIG. 2. In addition, the transition entity makes a determination as to whether a defined maximum wait time threshold value corresponding to the transposition of the set of elements has been exceeded (step 816). The defined maximum wait time threshold value may be, for example, maximum wait time threshold 230 in FIG. 2 or maximum wait time threshold 518 in FIG. 5.

If the transition entity determines that the defined maximum wait time threshold value corresponding to the transposition of the set of elements has not been exceeded, no output of step 816, then the process returns to step 810 where the transition entity continues to determine whether the receiving device is currently available to receive the transposition data object. If the transition entity determines that the defined maximum wait time threshold value corresponding to the transposition of the set of elements has been exceeded, yes output of step 816, then the transition entity deletes the transposition data object from the storage device (step 818). Thereafter, the process terminates.

Figure 9A:
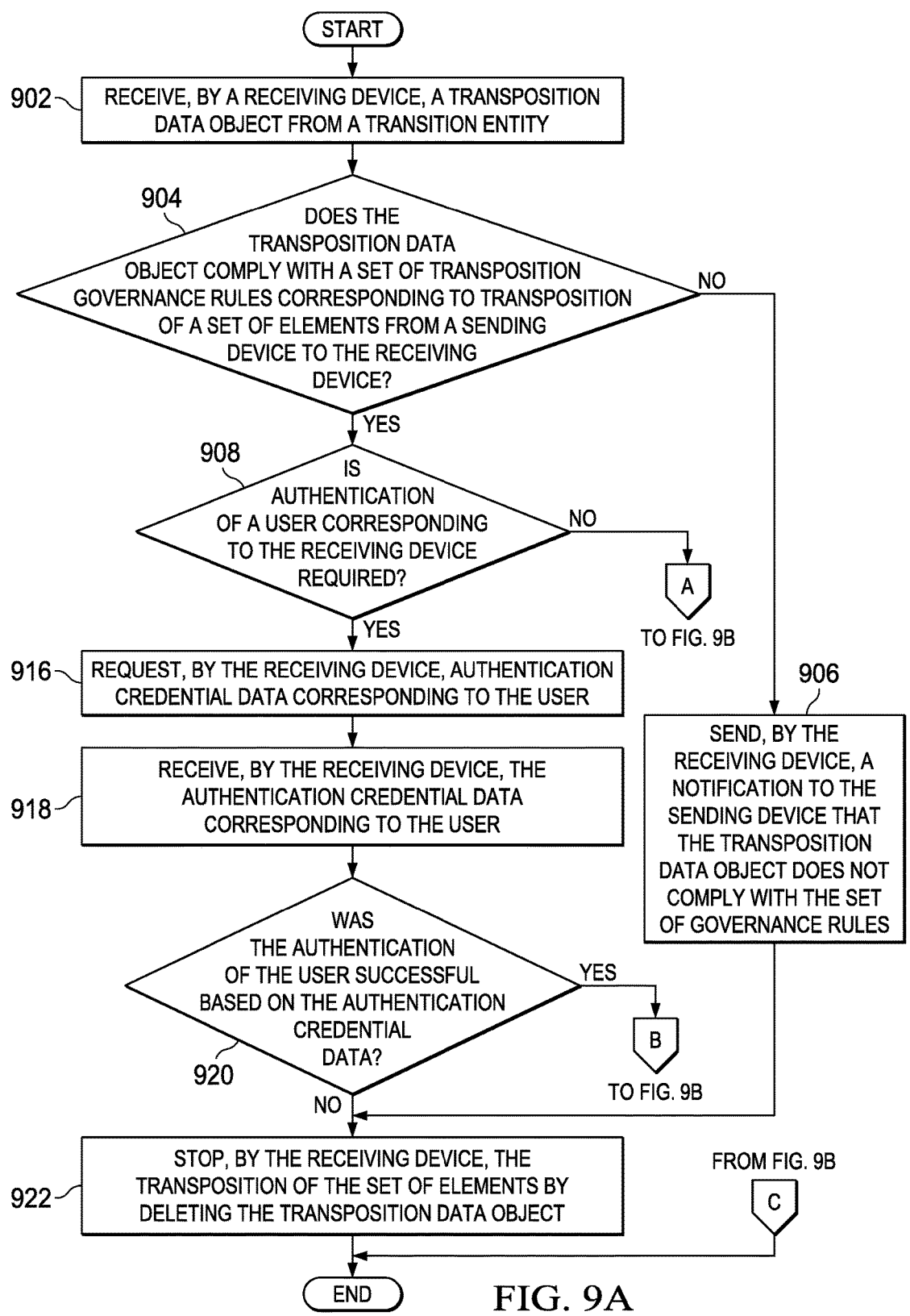
FIGS. 9A-9B are a flowchart illustrating a process for a receiving device in accordance with an illustrative embodiment.
Figure 9B:
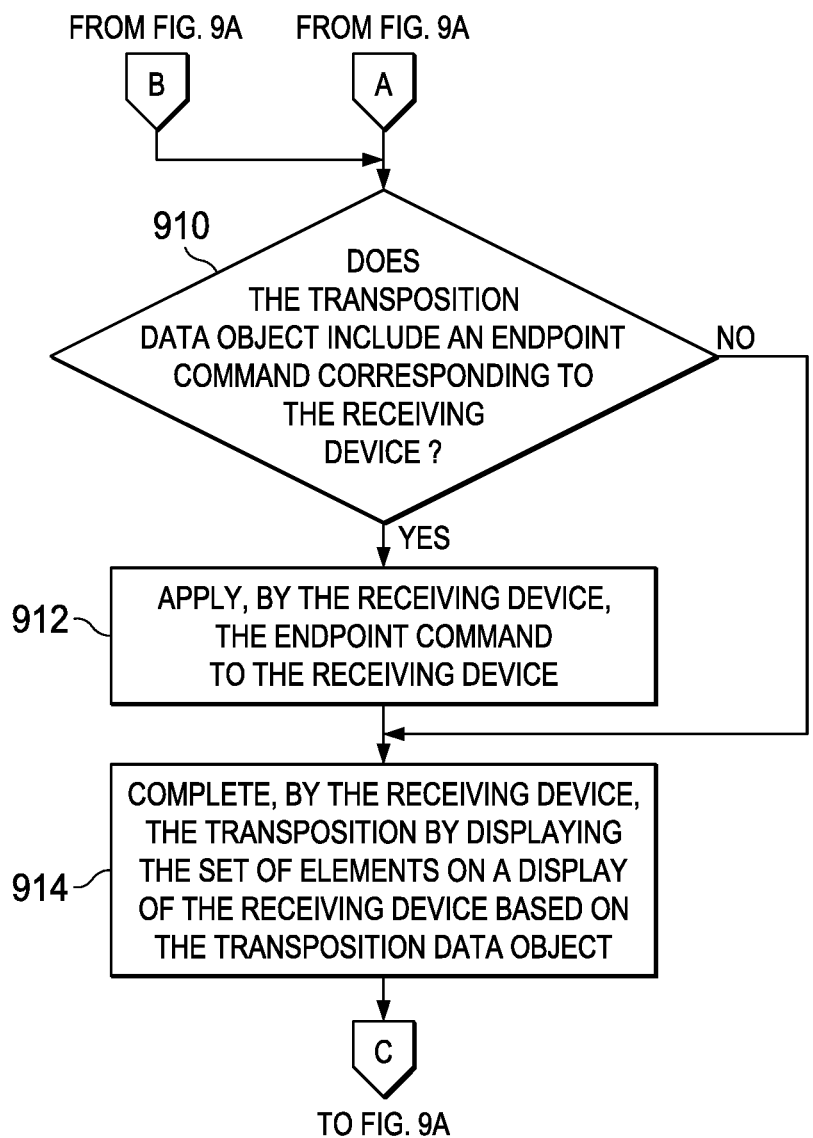

With reference now to FIGS. 9A-9B, a flowchart illustrating a process for a receiving device is shown in accordance with an illustrative embodiment. The process shown in FIGS. 9A-9B may be implemented in a receiving device, such as, for example, client 112 in FIG. 1, local computing device 320B in FIG. 3, or receiving device 506 in FIG. 5.

The process begins when the receiving device receives a transposition data object from a transition entity (step 902). The transposition data object may be, for example, transposition data object 514 in FIG. 5. The transition entity may be, for example, transition entity 504 in FIG. 5.

After receiving the transposition data object in step 902, the receiving device makes a determination as to whether the transposition data object complies with a set of transposition governance rules corresponding to transposition of a set of elements from a sending device to the receiving device (step 904). The set of transposition governance rules may be, for example, transposition governance rules 520 in FIG. 5. The sending device may be, for example, sending device 502 in FIG. 5. If the receiving device determines that the transposition data object does not comply with the set of transposition governance rules corresponding to transposition of the set of elements from the sending device to the receiving device, no output of step 904, then the receiving device sends a notification to the sending device that the transposition data object does not comply with the set of governance rules (step 906). Thereafter, the process proceeds to step 922. If the receiving device determines that the transposition data object does comply with the set of transposition governance rules corresponding to transposition of the set of elements from the sending device to the receiving device, yes output of step 904, then the receiving device makes a determination as to whether authentication of a user corresponding to the receiving device is required (step 908).

If the receiving device determines that authentication of the user corresponding to the receiving device is not required, no output of step 908, then the receiving device makes a determination as to whether the transposition data object includes an endpoint command corresponding to the receiving device (step 910). The endpoint command may be, for example, receiving device endpoint command 240 in FIG. 2. If the receiving device determines that the transposition data object does not include an endpoint command corresponding to the receiving device, no output of step 910, then the process proceeds to step 914. If the receiving device determines that the transposition data object does include an endpoint command corresponding to the receiving device, yes output of step 910, then the receiving device applies the endpoint command to the receiving device (step 912). Further, the receiving device completes the transposition by displaying the set of elements on a display of the receiving device based on the transposition data object (step 914). Thereafter, the process terminates.

Returning again to step 908, if the receiving device determines that authentication of the user corresponding to the receiving device is required, yes output of step 908, then the receiving device requests authentication credential data corresponding to the user (step 916). Subsequently, the receiving device receives the authentication credential data corresponding to the user (step 918). The authentication credential data corresponding to the user may be, for example, user authentication credential data 522 in FIG. 5.

Afterward, the receiving device makes a determination as to whether the authentication of the user was successful based on the authentication credential data (step 920). For example, the receiving device may compare the received user authentication credential data with stored user authentication credential data to verify the identity of the user. Alternatively, the receiving device may send the received user authentication credential data to an authentication server to verify the identity of the user.

If the receiving device determines that the authentication of the user was successful based on the authentication credential data, yes output of step 920, then the process returns to step 910 where the receiving device determines whether the transposition data object includes an endpoint command. If the receiving device determines that the authentication of the user was not successful based on the authentication credential data, no output of step 920, then the receiving device stops the transposition of the set of elements by deleting the transposition data object (step 922). Thereafter, the process terminates.

Thus, illustrative embodiments of the present invention provide a computer-implemented method, computer system, and computer program product for performing a transposition of a set of one or more elements and context data corresponding to the set of elements from a sending device to a set of one or more receiving devices using time delay and proximity detection controls. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for transferring an application and a context of the application between client devices via a network, the computer-implemented method comprising:

receiving, by a transposition server computer, a set of rules governing a transfer of the application and the context of the application from a sending client device to a receiving client device, wherein the set of rules includes device attribute rules that identify a minimum application version level corresponding to the receiving client device and user attribute rules that identify a type of user biometric data required prior to a user viewing the application on the receiving client device;

receiving, by the transposition server computer, the application and the context of the application for the transfer from the sending client device;

determining, by the transposition server computer, whether the set of rules governing the transfer of the application and the context of the application from the sending client device to the receiving client device is met; and responsive to the transposition server computer determining that the set of rules governing the transfer of the application and the context of the application from the sending client device to the receiving client device is met, transferring, by the transposition server computer, the application and the context of the application to the receiving client device via the network without losing state of the application.

2. The computer-implemented method of claim 1 further comprising:

responsive to the transposition server computer determining that the set of rules governing the transfer of the application and the context of the application from the sending client device to the receiving client device is met, determining, by the transposition server computer, whether the receiving client device is currently available to receive the application and the context of the application from the transposition server computer; and responsive to the transposition server computer determining that the receiving client device is currently available to receive the application and the context of the application from the transposition server computer, transferring, by the transposition server computer, the application and the context of the application to the receiving client device via the network.

3. The computer-implemented method of claim 2 further comprising:

responsive to the transposition server computer determining that the receiving client device is not currently available to receive the application and the context of the application from the transposition server computer, storing, by the transposition server computer, the application and the context of the application in a storage device of the transposition server computer.

4. The computer-implemented method of claim 3 further comprising:

responsive to the transposition server computer storing the application and the context of the application in the storage device of the transposition server computer, determining, by the transposition server computer, whether a defined maximum wait time threshold value has been exceeded after initiation of the transfer of the application and the context of the application from the sending client device to the receiving client device; and responsive to the transposition server computer determining that the defined maximum wait time threshold value has been exceeded after initiation of the transfer of the application and the context of the application from the sending client device to the receiving client device, deleting, by the transposition server computer, the application and the context of the application from the storage device of the transposition server computer.

5. The computer-implemented method of claim 1 further comprising:

responsive to the transposition server computer determining that the set of rules governing the transfer of the application and the context of the application from the sending client device to the receiving client device is not met, sending, by the transposition server computer, a notification to the sending client device that the application and the context of the application do not comply with the set of rules governing the transfer; and stopping, by the transposition server computer, the transfer of the application and the context of the application to the receiving client device.

6. The computer-implemented method of claim 1 further comprising:

receiving, by the transposition server computer, a set of transposition governance rules for each respective element in a set of elements corresponding to the application.

7. The computer-implemented method of claim 1 further comprising:

identifying, by the transposition server computer, the device attribute rules in the set of rules governing the transfer of the application and the context of the application from the sending client device to the receiving client device.

8. The computer-implemented method of claim 7, wherein the device attribute rules also include at least one of a specified time of day and day of week when the transfer of the application and the context of the application is to occur, physical geographic locations of the client devices during the transfer, owner of the client devices involved in the transfer, and configuration/security posture of the client devices involved in the transfer.

9. The computer-implemented method of claim 1 further comprising:

identifying, by the transposition server computer, the user attribute rules in the set of rules governing the transfer of the application and the context of the application from the sending client device to the receiving client device.

10. The computer-implemented method of claim 9, wherein the user attribute rules also include an identification of a set of users that can receive the transfer of the application and the context of the application on the receiving client device.

11. The computer-implemented method of claim 1, wherein the application and the context of the application are included in a transposition data object package, and wherein the transposition data object package also includes a system wide context of the sending client device.

12. The computer-implemented method of claim 11, wherein the transposition data object package also includes a receiving device endpoint command, and wherein the receiving device endpoint command is input by a user of the sending client device and initiates actions on the receiving client device.

13. A transposition server computer system for transferring an application and a context of the application between client devices via a network, the transposition server computer system comprising:
   a bus system;
   a storage device connected to the bus system, wherein the storage device stores program instructions; and
   a processor connected to the bus system, wherein the processor executes the program instructions to:
      receive a set of rules governing a transfer of the application and the context of the application from a sending client device to a receiving client device wherein the set of rules includes device attribute rules that identify a minimum application version level corresponding to the receiving client device and user attribute rules that identify a type of user biometric data required prior to a user viewing the application on the receiving client device;
      receive the application and the context of the application for the transfer from the sending client device;
      determine whether the set of rules governing the transfer of the application and the context of the application from the sending client device to the receiving client device is met; and
      transfer the application and the context of the application to the receiving client device via the network without losing state of the application in response to determining that the set of rules governing the transfer of the application and the context of the application from the sending client device to the receiving client device is met.

14. The transposition server computer system of claim 13, wherein the processor further executes the program instructions to:
   determine whether the receiving client device is currently available to receive the application and the context of the application from the transposition server computer system in response to determining that the set of rules governing the transfer of the application and the context of the application from the sending client device to the receiving client device is met; and
   transfer the application and the context of the application to the receiving client device via the network in response to determining that the receiving client device is currently available to receive the application and the context of the application from the transposition server computer system.

15. The transposition server computer system of claim 14, wherein the processor further executes the program instructions to:
   store the application and the context of the application in the storage device of the transposition server computer system in response to determining that the receiving client device is not currently available to receive the application and the context of the application from the transposition server computer system.

16. A computer program product for transferring an application and a context of the application between client devices via a network, the computer program product comprising a computer readable storage medium having program instructions embodied therewith, the program instructions executable by a transposition server computer to cause the transposition server computer to perform a method comprising:
   receiving, by the transposition server computer, a set of rules governing a transfer of the application and the context of the application from a sending client device to a receiving client device, wherein the set of rules includes device attribute rules that identify a minimum application version level corresponding to the receiving client device and user attribute rules that identify a type of user biometric data required prior to a user viewing the application on the receiving client device;
   receiving, by the transposition server computer, the application and the context of the application for the transfer from the sending client device;
   determining, by the transposition server computer, whether the set of rules governing the transfer of the application and the context of the application from the sending client device to the receiving client device is met; and
   responsive to the transposition server computer determining that the set of rules governing the transfer of the application and the context of the application from the sending client device to the receiving client device is met, transferring, by the transposition server computer, the application and the context of the application to the receiving client device via the network without losing state of the application.

17. The computer program product of claim 16 further comprising:
   responsive to the transposition server computer determining that the set of rules governing the transfer of the application and the context of the application from the sending client device to the receiving client device is met, determining, by the transposition server computer, whether the receiving client device is currently available to receive the application and the context of the application from the transposition server computer; and
   responsive to the transposition server computer determining that the receiving client device is currently available to receive the application and the context of the application from the transposition server computer, transferring, by the transposition server computer, the application and the context of the application to the receiving client device via the network.

18. The computer program product of claim 17 further comprising:
   responsive to the transposition server computer determining that the receiving client device is not currently available to receive the application and the context of the application from the transposition server computer, storing, by the transposition server computer, the application and the context of the application in a storage device of the transposition server computer.

19. The computer program product of claim 18 further comprising:
   responsive to the transposition server computer storing the application and the context of the application in the storage device of the transposition server computer, determining, by the transposition server computer, whether a defined maximum wait time threshold value has been exceeded after initiation of the transfer of the application and the context of the application from the sending client device to the receiving client device; and responsive to the transposition server computer determining that the defined maximum wait time threshold value has been exceeded after initiation of the transfer of the application and the context of the application from the sending client device to the receiving client device, deleting, by the transposition server computer, the application and the context of the application from the storage device of the transposition server computer.

20. The computer program product of claim 16 further comprising:
responsive to the transposition server computer determining that the set of rules governing the transfer of the application and the context of the application from the sending client device to the receiving client device is not met, sending, by the transposition server computer, a notification to the sending client device that the application and the context of the application do not comply with the set of rules governing the transfer; and
stopping, by the transposition server computer, the transfer of the application and the context of the application to the receiving client device.

\* \* \* \* \*